United States Patent Office 3,112,305
Patented Nov. 26, 1963

3,112,305
6-METHYLENE-3-OXO-Δ⁴-STEROIDS AND PROCESS FOR THEIR PREPARATION
David Neville Kirk and Vladimir Petrow, London, England, assignors to The British Drug Houses Limited
No Drawing. Filed Nov. 6, 1961, Ser. No. 150,177
Claims priority, application Great Britain Nov. 7, 1960
20 Claims. (Cl. 260—239.55)

This invention is for improvements in or relating to organic compounds and has particular reference to steroidal materials containing an additional carbon substituent at $C_6$.

It is an object of the present invention to provide a new and general process for the preparation of 6-methylene-3-oxo-Δ⁴-steroids.

We have made the surprising discovery that the steroidal products of our copending application No. 150,176, filed on November 6, 1961, now Patent No. 3,095,411 which may be regarded structurally as the 3-enol ethers of 6-hydroxymethyl-3-oxo-Δ⁴-steroids may be converted by the process of this invention into the corresponding 6-methylene-3-oxo-Δ⁴-steroids.

This is a discovery of outstanding importance in the field of steroid technology. Many of the herein described derivatives possess valuable biological properties which render them of value in, for example, the veterinary field. Thus, for example, the derivatives of 17β-hydroxyandrostane which fall within the scope of the present invention may possess anabolic, androgenic and claudogenic properties. The derivatives of 17α-acyloxypregnan-20-one which fall within the scope of the present invention may possess progestational properties when administered by the oral route. The derivatives of 16α,17α-isopropylidenedioxypregnan-20-one may likewise show progestational activity as well as claudogenic activity. Claudogenic activity will, in general, also be shown by derivatives of 9α - fluoropregnan - 11β,17α,21 - trihydroxy - 20-one, 17α,21-dihydroxypregnane-11,20-dione, 11β,17α,21-trihydroxypregnane-20-one and by the 21-acyl and 17,21-diacyl derivatives thereof. In addition, such compounds may show glucocorticoid activity.

The compounds of the present invention form exceptionally convenient intermediates for the preparation of the therapeutically valuable 6α-methyl steroidal hormones of the androstane and pregnane series, which compounds are now well-known in clinical practice, and into which they may be converted, for example by catalytic hydrogenation followed by treatment with very dilute ethanolic hydrochloric acid or potassium hydroxide. In addition the products of the present invention represent novel types of steroidal materials which themselves possess intrinsic values as "building blocks" for other types of steroidal materials containing a $C_6$ carbon substituent. Thus, for example, they may be expected to react with a variety of reagents such as the halogens, peracids, and to undergo hydrogenation. The numerous possibilities for reaction possessed by the products of the present invention will be apparent to those skilled in the art.

It is a further object of the present invention to provide pharmaceutical preparations of the biologically active materials.

The present invention provides new 6-methylene-3-oxo-Δ⁴-steroids including the Formula I below.

The invention provides the following new products:
6-methylene cortisone 21-acetate
6-methylene cortisone 17,21-diacetate which are of value on account of their claudogenic activity and as intermediates for the preparation of the 6-methylated corticoids into which they may be converted by catalytic hydrogenation
6-methylene-17,20,20,21-bismethylenedioxy cortisone
6-methylene - 17,20,20,21 - bismethylenedioxy hydrocortisone
21 - acetoxy - 17α - hydroxy-6-methylenepregna-4,9(11)-diene-3,20-dione which are of value as intermediates for 6-methylenic corticoids and 6-methyl corticoids into which they may be converted as hereinabove described or by methods of prior art
17α-acetoxy-6,16-dimethylenepregn-4-ene-3,20-dione
17α-acetoxy-6-methylenepregn-4-ene-3,20-dione
17α - acetoxy - 16α - methyl - 6 - methylenepregn - 4 - ene-3,20-dione
17α - acetoxy - 16 - ethylidene - 6 - methylenepregn-4-ene-3,20-dione
17α - acetoxy - 21 - fluoro - 6 - methylenepregn - 4-ene-3,20-dione which are of value on account of their progestational and/or claudogenic activity
6-methylene-16α,17α - isopropylidenedioxypregn - 4 - ene-3,20-dione
6-methyleneprogesterone which are of value on account of their progestational and claudogenic properties
17β - acetoxy - 2α - methyl - 6 - methyleneandrost-4-en-3-one
17β-acetoxy-6-methyleneandrost-4-en-3-one
17β-acetoxy-6-methylene-19-norandrost-4-en-3-one
6-methylenetestosterone
17β - acetoxy - 17α - methyl - 6 - methyleneandrost-4-en-3-one
17β - propionoxy - 6 - methylene-17α-vinylandrost-4-en-3-one
17α-methyl-6-methylenetestosterone which are of value on account of their androgenic/anabolic/claudogenic activity and as intermediates for the preparation of the corresponding 6-methylated steroids
16 - methyl - 6 - methylenepregna-4,16-diene-3,20-dione
6-methylene-25D-spirost-4-en-3-one
20β-acetoxy-6-methylenepregn-4-en-3-one
11α,17β-diacetoxy-6-methyleneandrost-4-en-3-one
6 - methylenepregna - 4,17(20) - dien-3-one-21-oate ethyl ester
6-methyleneandrost-4-ene-3,17-dione which are of value as novel intermediates convertible, for example, into the corresponding 6-methyl steroids by catalytic hydrogenation
6-methylene testololactone which is of value as an intermediate in the preparation of other derivatives of testolactone into which it may be converted, for example, by oxidation, reduction or halogenation
6 - methylene - 17β - propionoxy-17α-(prop-1'-ynyl) androst-4-en-3-one which has progestational activity
β - [6 - methylene - 3-oxo-17β-hydroxyandrost-4-en-17α-yl]propionic acid lactone which is of value as an intermediate in the preparation of the corresponding 6α-methyl lactone, into which it may be converted by hydrogenation and which product is known by those skilled in the art to be a potent aldosterone antagonist 6-methylenedesoxycorticosterone acetate which is of value as an intermediate in the preparation of the corresponding 6-methyl derivative into which it may be converted by hydrogenation.

According to the present invention there is provided a process for the preparation of 6-methylene-3-oxo-$\Delta^4$-steroids including the formula

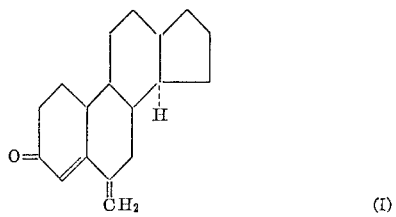

which process comprises treating a 3-enol ether of a 6-hydroxymethyl steroid including the formula

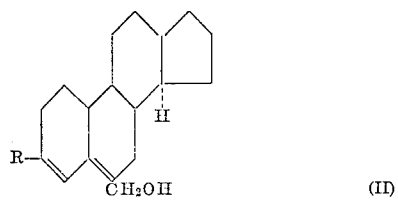

where R is O-alkyl, O-hydroxyalkyl, O-cycloalkyl, O-alkaryl or a functional derivative thereof with an acidic reagent.

An unexpected feature of the present invention is the rapidity and ease with which the 6-hydroxymethyl derivatives pass into 3-oxo-$\Delta^4$-methylene products in high yield.

Conversion of the 6-hydroxymethyl derivatives into the corresponding 6-methylene-3-oxo-$\Delta^4$-steroids is effected by reagents which are known by prior art to regenerate 3-oxo-$\Delta^4$-steroids from the corresponding 3-enol ethers. Such reagents are acidic in character and include procedures, by way of example, such as solution of the steroid in acetic acid followed by dilution with water, treatment with catalytic quantities of acids including toluene-p-sulphonic acid in such solvents as aqueous dioxan, treatment with sulphuric acid in ethanol, or with Lewis acids in acetone. Thus, for example, when the preferred methyl-, ethyl- and benzyl enol ethers are employed their fission to the corresponding 3-oxo-$\Delta^4$-6-methylene steroids may be achieved by dissolving them in warm acetic acid and subsequently diluting the resulting solutions with water, when the required products will be precipitated, generally in a crystalline form.

The 6-hydroxymethyl starting materials (II) used in the present invention are described in our copending application No. 150,176. They are prepared from the 3-enol ethers of steroidal 3-oxo-4-enes which may additionally be substituted by Hydroxyl and acyloxy groups and functional derivatives thereof in such positions as 11, 12, 16 (including 16-hydroxymethyl), 14, 15, 17, 18, 19, 20 and 21 (including the condensation products of 16α,17α-glycols with carbonyl components). Thiol groups at $C_{16}$ are unaffected.

Carbonyl groups such for example as carbonyl groups at 11, 12, 15, 16, 17, 18 and 20.

Carbalkoxy groups at $C_{13}$, $C_{16}$, $C_{17}$ or in the side chain.

Cyano groups at $C_{13}$, $C_{16}$ and $C_{17}$.

Alkyl groups, in particular Me groups at $C_2$, $C_{11}$, $C_{16}$, $C_{17}$, $C_{21}$, and ethyl at $C_{17}$.

Alkenyl and alkynyl groups in particular vinyl and allyl at $C_{17}$, propynyl and chloroethynyl at $C_{17}$.

Methylene and ethylidene groups at $C_{11}$, $C_{16}$ and $C_{17}$, groups as benzylidene at $C_{21}$.

Lactone, ether and spiroketal residues: Spirolactone residues such as —O.CO.CH$_2$.CH$_2$— attached to $C_{17}$, etheric groups at $C_{16}$, and bridging $C_{18}$ and $_{20}$, spiroketal moieties such as are present in diosgenone, 20,20-ethylenedioxy groups, 17,17-ethylenedioxy groups and similar functional derivatives.

Halogen groups and in particular chlorine and fluorine at $C_9$, $C_{16}$ and $C_{21}$.

Unsaturated linkages in particular at $C_{9(11)}$, $C_{11}$, $C_{14}$, $C_{16}$ and $C_{17(20)}$.

Ketol groups in particular acylated ketol groups at $C_{16}$–$C_{17}$, $C_{17}$–$C_{20}$ and $C_{20-12}$.

Cortical side chains, both acylated, or converted into such "protective" derivatives as bismethylenedioxy, cyclic carbonates cyclic acetonides or orthoformates.

Epoxides and halohydrins, particularly at $C_{16-17}$.

The 3-enol ethers of the steroidal 3-oxo-4-enes are reacted with the Vilsmeier reagent in a solvent such as methylenedichloride at 0° C. followed by hydrolysis of the resulting iminium salts when the corresponding 6-formyl derivatives are obtained. Reduction of these 6-formyl derivatives as described in our copending application No. 150,176, for example, catalytically with Raney nickel (rendered non-alkaline for example by ethyl acetate treatment) or with platinum on charcoal (in a sodium acetate buffer) yields the required 6-hydroxymethyl derivatives (II).

The process of the invention may be applied to the 6-hydroxymethyl derivatives derived from the following steroids and acyl derivatives thereof.

Testerosterone
2-methyltestosterone
17α-methyltestosterone
9(11)-dehydro-17α-methyltestosterone
17α-propynyltestosterone
17α-acyloxyprogesterone
9(11)-dehydro-17α-acyloxyprogesterone
16-methyl-17α-acyloxyprogesterone
9(11)-dehydro-16-methyl-17α-acyloxyprogesterone
16-methylene-17α-acyloxyprogesterone
9(11)-dehydro-16-methylene-17α-acyloxyprogesterone
17α-acyloxy-16-ethylideneprogesterone
16α,17α-dimethylmethylenedioxyprogesterone
9(11)-dehydro - 16α,17α - dimethylmethylenedioxyprogesterone
Cortisone
16-methylcortisone
21-methylcortisone
16-methylenecortisone
16α-hydroxycortisone and the (16α,17α)-acetonide thereof
Hydrocortisone
16-methylhydrocortisone
21-methylhydrocortisone
16-methylenehydrocortisone
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11) - diene - 3,20-dione
21-methyl-17α,21-dihydroxypregna-4,9(11) - diene - 3,20-dione
16-methylene - 17α,21 - dihydroxypregna - 4,9(11) - diene-3,20-dione
16α-hydroxy - 17α,21 - dihydroxypregna - 4,9(11) - diene-3,20-dione and the (16,17)-acetonide thereof
21 - fluoro - 17α-hydroxypregna-4,9(11)-diene-3,20-dione and the (16,17)-acetonide thereof
21-fluoro-17α-hydroxypregn-4-ene-3,11,20-trione and the (16,17)-acetonide thereof
21-fluoro-11,17α-dihydroxypregn-4-ene-3,20-dione and the (16,17)-acetonide thereof
21-hydroxypregna-4,17-dien-3-one
11-oxo-21-hydroxypregna-4,17-dien-3-one
11,21-dihydroxypregna-4,17-dien-3-one
9(11)-dehydro-21-hydroxypregna-4,17-dien-3-one
3-oxopregna-4,17-dienoic acid (esters)
3,11-dioxopregna-4,17-dienoic acid (esters)

11-hydroxy-3-oxopregna-4,17-dienoic acid (esters)
9(11)-dehydro-3-oxopregna-4,17-dienoic acid (esters)
21-fluoro-17α-acyloxyprogesterone
Progesterone
16-methylprogesterone
11-oxoprogesterone
9(11)-dehydroprogesterone
21-methylprogesterone
Diosgenone
17α-cyano-17β-hydroxyandrost-4-en-3-one
16-methyl-16,17-dehydroprogesterone
16-cyano-progesterone
16-carbalkoxyprogesterone
16-hydroxymethylprogesterone
3-(3-oxo-17β-hydroxyandrost-4-en-17α-yl)propionic acid
21-fluoroprogesterone
Testololactone
16-fluoro-corticoids
The 9α-fluoro derivatives of the above 11β-hydroxy and 11-oxo-steroids Following is a description by way of example of methods of carrying the invention into effect.

EXAMPLE 1

*Preparation of 6-Methylene-16α,17α-Isopropylidenedioxypregn-4-Ene-3,20-Dione*

3 - ethoxy - 6-hydroxymethyl-16α,17α-isopropylidenedioxypregna-3,5-dien-20-one (1 g.) with gentle warming. Water was added dropwise until crystals began to separate. Purification from aqueous methanol gave 6-methylene-16α,17α-isopropylidenedioxypregn - 4 - ene - 3,20-dione as feathery needles, M.P. 225° C., with decomposition, $[\alpha]_D^{25}$ +253° C.

$\lambda_{max.}^{EtOH}$ 259 to 260 mμ (ε 11,200)

EXAMPLE 2

*Preparation of 17α,20:20,21-Bismethylenedioxy-6-methylenepregn-4-Ene-3,11-Dione*

17α,20:20,21 - bismethylenedioxy - 3-ethoxy-6-hydroxymethylpregna-3,5-dien-11-one (1 g.) was warmed in acetic acid (15 ml.) for ½ hour and the solution gradually diluted with water. The precipitated solid was recrystallised from aqueous methanol to yield 17α,20:20,21-bismethylenedioxy-6-methylenepregn-4-ene-3,11-dione as needles, M.P. 201 to 203° C., $[\alpha]_D^{21}$ +120° (c., 1.11 in CHCl₃)

$\lambda_{max.}^{EtOH}$ 258.5 mμ (ε 11,480)

The 6-methylene bismethylenedioxy derivative was treated with aqueous formic acid for 30 minutes on a steam bath, the mixture poured into water and the product isolated with ether. It was hydrolysed, acetylated and purified from aqueous-methanol to give 6-methylene-cortisone acetate, M.P. 191 to 193° C., $[\alpha]_D^{25}$ +355° (c., 0.96 in CHCl₃)

$\lambda_{max.}^{EtOH}$ 257.5 mμ (ε 11,980)

EXAMPLE 3

*Preparation of 6-Methylenepregna-4-En-3,20-Dione*

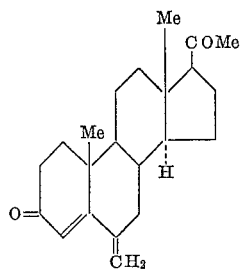

3-methoxy-6-hydroxymethyl-pregna-3,5-dien-20-one (4 g.) was dissolved in glacial acetic acid (20 ml.) by warming for 5 minutes on the steam bath. Addition of water gave a sticky solid. This was extracted with ether, washed with sodium carbonate solution and water, dried (anhydrous sodium sulphate) treated with charcoal and stripped in vacuo to give a gum. 6-methylenepregna-4-en-3,20-dione was isolated by chromatography on neutral alumina and was crystallised from aqueous acetone, M.P. 133 to 135° C., $[\alpha]_D^{25}$ +373° (c., 0.62 in CHCl₃)

$\lambda_{max.}^{EtOH}$ 259 to 260 mμ (ε 11,200)

EXAMPLE 4

*Preparation of 6-Methyleneandrost-4-Ene-3,17-Dione*

3-ethoxy-6-formylandrosta-3,5-dien-17-one (2 g.) in dioxan (50 ml.) was treated with lithium cyanoborohydride (Drehfall and Keil, J. Prak. Chem., 1958, 6, 80) (1.2 g.) and the mixture heated at 100° C. for 24 hours. The resulting 6-hydroxymethyl derivative, isolated with ether, was dissolved in acetic acid (25 ml.) by gentle warming. When solution was complete, the mixture was poured into water and the precipitated solids purified by crystallisation to give 6-methyleneandrost-4-ene-3,17-dione, $\gamma_{max.}^{Nujol}$ 1750, 1675, 1620 and 1600 cm.⁻¹

EXAMPLE 5

*Preparation of 17β-Acetoxy-2α-Methyl-6-Methyleneandrost-4-En-3-One*

17β - acetoxy - 3-ethoxy-6-hydroxymethyl-2α-methylandrosta-3,5-diene (3 g.) was warmed in acetic acid (10 ml.) and the solution diluted gradually with water. The separated solids were collected and purified. 17β-acetoxy-2α-methyl-6-methyleneandrost-4-en-3-one crystallised from methylene dichloride and methanol in plates, M.P. 179 to 181° C., $[\alpha]_D^{25}$ +243° (c., 0.76 in CHCl₃)

$\lambda_{max.}^{EtOH}$ 257 to 260 mμ (ε 11,120)

EXAMPLE 6

*Preparation of 6-Methylene-25D-Spirost-4-En-3-One*

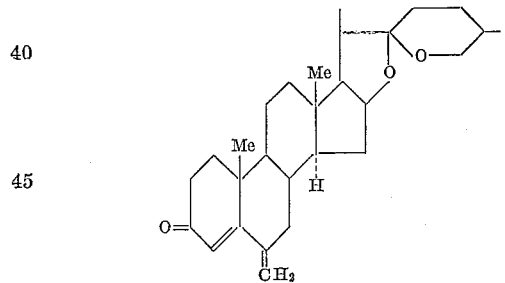

A solution of 3-ethoxy-6-formyl-25D-spirosta-3,5-diene (5 g.) in methanol (200 ml.) was treated with sodium borohydride (1 g.). After 15 minutes, excess of reducing agent was destroyed by the addition of a little acetic acid, and the product was isolated by precipitation with water and extraction with ether. The crude 6-hydroxymethyl derivative so obtained was dissolved in warm acetic acid (30 ml.), and water added until crystallisation commenced. The product was purified from methylene dichloride/methanol to give 6-methylene-25D-spirost-4-en-3-one, dense plates, M.P. 204 to 205° C., $[\alpha]_D^{25}$ +149° (c., 1.13 in chloroform), $\gamma_{max.}^{Nujol}$ 1675, 1620 and 1600 cm.⁻¹

EXAMPLE 7

*Preparation of 17α-Acetoxy-6,16-Bismethylenepregn-4-Ene-3,20-Dione*

17α-acetoxy - 6 - hydroxymethyl - 3 - methoxy-16-methylenepregna-3,5-diene-20-one (1 g.) was dissolved in acetic acid (20 ml.) by gentle warming. When solution was complete, the mixture was poured into water and the precipitated solids were collected and crystallised from methanol to give 17α-acetoxy-6,16-bismethylenepregn-4-ene-3,20-dione, needles, M.P. 223 to 225° C., $[\alpha]_D$ +73° (c., 0.97 in chloroform) $\gamma_{max.}$ 248 to 249 mμ (ε 10,810).

EXAMPLE 8

*Preparation of 6-Methylene-16-Methyl-16-Dehydroprogesterone*

3-methoxy - 6 - hydroxymethyl - 16 - methylpregna-3,5,16-trien-20-one (1.5 g.) was dissolved with warming in glacial acetic acid (6 ml.) and the solution diluted with water, extracted with ether (100 ml.) and the extract washed well with portions of cold dilute potassium hydrogen carbonate solution until the washings were alkaline. The ethereal solution was dried with anhydrous sodium sulphate and evaporated. The product was a yellow syrup, which solidified slowly on trituration with hexane. It was recrystallised from isopropyl ether to give 6-methylene - 16 - methyl-16-dehydroprogesterone, M.P. 120 to 123° C.

EXAMPLE 9

*Preparation of 17β-Acetoxy-6-Methyleneandrost-4-En-3-One*

17β-acetoxy - 6 - hydroxymethyl - 3 - methoxyandrosta-3,5-diene (5 g.) was dissolved in acetic acid (20 ml.) by gentle warming. The solution was then diluted with water in portions so that the product separated in crystalline form. It was purified from aqueous methanol to give 6-methylenetestosterone acetate in prisms, M.P. 139 to 141° C., $\lambda_{max.}^{EtOH}$ 260 to 262 m$\mu$ ($\epsilon$ 11,540)

$[\alpha]_D^{25}$ +266° (c., 0.89 in CHCl$_3$), $\gamma_{max.}$ (in CH$_2$Cl$_2$) 1727, 1664, 1623 and 1599 cm.$^{-1}$.

EXAMPLE 10

*Preparation of 17α-Acetoxy-6-Methyleneprogesterone*

17α-acetoxy - 6 - hydroxymethyl - 3 - methoxypregna-3,5-diene-20-one (3 g.) was dissolved in acetic acid (15 ml.) by gentle warming. The solution was diluted to turbidity with water, when 17α-acetoxy-6-methyleneprogesterone separated out slowly. Purified from ethyl acetate/chloroform it formed crystals, M.P. 238 to 244° C., $[\alpha]_D^{26}$ +226° (c., 1.04 in CHCl$_3$), $\lambda_{max.}^{EtOH}$ 260 m$\mu$ ($\epsilon$ 13,960)

$\gamma_{max.}$ (in CCl$_4$) 3083, 1742, 1718, 1677, 1624 and 1599 cm.$^{-1}$.

EXAMPLE 11

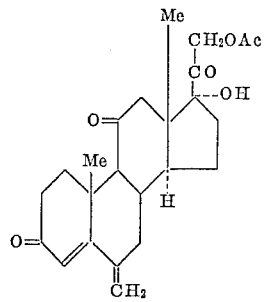

*Preparation of 6-Methylene Cortisone Acetate*

6-hydroxymethyl cortisone acetate 3-enol ethyl ether (1.5 g.) was dissolved in 80% acetic acid (12 ml.) at 40 to 50° C. The solution was diluted with small portions of water to allow separation of the crystalline product. Purification from acetone/hexane gave 6-methylene cortisone acetate in prisms, M.P. 191 to 193° C. identical with the compound prepared in Example 2.

EXAMPLE 12

*Preparation of 6-Methylene Testosterone Acetate*

Hydrolysis of 17α-acetoxy-3-benzyloxy - 6 - hydroxymethylandrosta-3,5-diene (0.5 g.) in 80% acetic acid (5 ml.) at 58° C. for 10 minutes, and dilution with water to turbidity, gave 6-methylene testosterone acetate, M.P. 139 to 141° C.

EXAMPLE 13

*Preparation of 17α-Acetoxy-16-Ethylidene-6-Methyleneprogesterone*

17α-acetoxy - 16 - ethylidene - 6 - hydroxymethyl-3-methoxypregna-3,5-dien-20-one was treated with acetic acid by the procedure of Example 7 to form 17α-acetoxy-16-ethylidene-6-methyleneprogesterone, M.P. 194 to 198° C., $\lambda_{max.}^{EtOH}$ 261 m$\mu$ ($\epsilon$ 11,990)

EXAMPLE 14

*Preparation of 6-Methylene-17β-Propionoxy-17α-(Prop-1'-Ynyl)-Androst-4-En-3-One*

A solution of 3-ethoxy-6-hydroxymethyl-17β-propionoxy-17α-(prop-1'-ynyl)androsta-3,5-diene (1 g.) in acetic acid (10 ml.) was heated on a steam bath for 10 minutes, cooled and water added. The precipitated solid was recrystallised from aqueous methanol to give 6-methylene-17β-propionoxy - 17α - (prop-1'-ynyl)androst-4-en-3-one needles, M.P. 141 to 142° C., $\gamma_{max.}^{Nujol}$ 1730, 1675, 1625 and 1600 cm.$^{-1}$ $[\alpha]_D^{24}$ +161° (c., 0.99 in chloroform).

EXAMPLE 15

*Preparation of 21-Acetoxy-17α-Hydroxy-6-Methylenepregna-4,9(11)-Diene-3,20-Dione*

21-acetoxy - 17α - hydroxy - 6 - hydroxymethyl-3-methoxypregna-3,5,9(11)-trien-20-one (1 g.) was dissolved in 80% aqueous acetic acid (20 ml.) at 40° C. and the solution diluted with water, when the product separated. Purification from acetone/hexane gave 21-acetoxy-17α-hydroxy - 6 - methylenepregna-4,9(11)-diene-3,20-dione, M.P. 165 to 172° C., $[\alpha]_D^{23}$ + 209° (c., 0.78 in chloroform).

EXAMPLE 16

*Preparation of 6 Methylene Cortisone*

3-methoxy-6-hydroxymethyl-17α,21 - methoxymethylenedioxypregna-3,5-diene-11,20-dione was treated with 70% acetic acid for 16 hours at 30° C. Dilution with water gave 6-methylene cortisone, $\lambda_{max.}$ 260 m$\mu$ ($\epsilon$=11,800).

EXAMPLE 17

*Preparation of 6-Methylene Testosterone*

17β - hydroxy - 3-methoxy-6-hydroxymethyl-androsta-3,5-diene (0.6 g.) in acetone (10 ml.) was treated with 10% aqueous perchloric acid (2 drops) for 10 minutes at room temperature. Dilution with water gave a solid which was purified from aqueous ethanol. 6-methylene testosterone separated in needles, M.P. 175° C., $[\alpha]_D^{20}$ +292° (c., 1.01 in chloroform)

$\lambda_{max.}^{EtOH}$ 259 m$\mu$ ($\epsilon$ 11,000)

EXAMPLE 18

*Preparation of 17β-Acetoxy-17α-Methyl-6-Methyleneandrost-4-En-3-One*

A solution of 17β-acetoxy-6-formyl-3-methoxy-17α-methylandrosta-3,5-diene (1 g.) in a mixture of dry tetrahydrofuran (15 ml.) and methanol (3 ml.) was treated with sodium borohydride (300 mg.). After stirring for 15 minutes, the mixture was poured into water (200 ml.) and the product isolated by extraction with ether. The crude 6-hydroxymethyl derivative so obtained was dissolved in warm acetic acid (4 ml.) and water added. The product was isolated with ether and purified from a small volume of methanol to give 17β-acetoxy-17α- methyl-6-methyleneandrost-4-en-3-one, slender rods, M.P. 129 to 130° C., $[\alpha]_D^{25}$ +219° (c., 0.83 in dioxan)

$\lambda_{max.}^{EtOH}$ 260 m$\mu$ ($\epsilon$ 11,800) $\gamma_{max.}^{Nujol}$ 1730, 1680, 1625 and 1600 cm.$^{-1}$

EXAMPLE 19

*Preparation of 6-Methylene-17β-Propionoxy-17α-Vinylandrost-4-En-3-One*

A solution of 3-ethoxy-6-formyl-17β-propionoxy-17α-vinylandrosta-3,5-diene (1.9 g.) in methanol (50 ml.) was treated with sodium borohydride (500 mg.), and the mixture left at room temperature for 30 minutes. After the addition of acetic acid (0.5 ml.), dilution with water gave a gum which was isolated with ether and treated with acetic acid (10 ml.) for 10 minutes at 100° C. The product, isolated with ether, was crystallised from aqueous acetone to give 6-methylene-17β-propionoxy-17α-vinylandrost-4-en-3-one needles, M.P. 129 to 130° C., $\gamma_{max.}^{Nujol}$ 1730, 1675, 1630 and 1600 cm.$^{-1}$ $[\alpha]_D^{24}$ +261° (c., 0.37 in chloroform)

EXAMPLE 20

*Preparation of 20β-Acetoxy-6-Methylenepregn-4-En-3-One*

A solution of 20β-acetoxy-3-ethoxy-6-hydroxymethylpregna-3,5-diene (2 g.) in acetic acid (10 ml.) was warmed to 100° C. for 10 minutes and the solution diluted with water. The precipitated product was crystallised from aqueous methanol to give 20β-acetoxy-6-methylenepregn-4-en-3-one as needles, M.P. 176 to 178° C., $[\alpha]_D^{23}$ +274.4° (c., 109 in chloroform)

$\lambda_{max.}^{EtOH}$ 256 m$\mu$ ($\epsilon$ 11,000)

EXAMPLE 21

*Preparation of 6-Methylene 17,20,20,21-Bismethylenedioxyhydrocortisone*

A suspension of 17α, 20:20,21-bismethylenedioxy-3-ethoxy-11β-hydroxypregna-3,5-dien [5.8 g., M.P. 190 to 193° C., $[\alpha]_D^{25}$ —187° (c, 1.08 in dioxan)

$\lambda_{max.}^{EtOH}$ 240.5 m$\mu$ ($\epsilon$ 20,310)

prepared from 17α,20:20,21-bismethylenedioxy-3-ethoxypregna-3,5-dien-11-one by prolonged reduction with sodium borohydride in boiling methanol] in ethylenedichloride (75 ml.) was added, at 0° C. to a stirred suspension of the complex prepared from phosgene (1.5 g.) and dimethylformamide (2.15 g.) in ethylenedichloride (25 ml.). After 3 hours at room temperature the product was isolated and was reduced with sodium borohydride for 10 minutes at room temperature, in a mixture of tetrahydrofuran and methanol. The product obtained by dilution with water and extraction into ether, was treated with acetic acid at 100° C. for 10 minutes. Dilution with water precipitated 17α,20:20,21-bismethylenedioxy-11β-hydroxy-6-methlenepregn-4-en - 3 - one, which crystallised from dichloromethane/methanol as needles, M.P. 224 to 226° C., $[\alpha]_D^{23}$ +167.7° (c., 0.74 in chloroform)

$\lambda_{max.}^{EtOH}$ 261 to 262 m$\mu$ (c., 11,580)

EXAMPLE 22

*Preparation of 17α-Acetoxy-16α-Methyl-6-Methylenepregn-4-Ene-3,20-Dione*

17α-Acetoxy-6-hydroxymethyl-3-methoxy-16α - methylpregna-3,5-dien-20-one (0.5 g.) was dissolved in warm acetic acid (5 ml.) and after 3 minutes the product was precipitated by addition of water. 17α-acetoxy-16α-methyl-6-methylenepregn-4-ene - 3,20 - dione crystallised from aqueous methanol as needles $\lambda_{max.}^{EtOH}$ 258 to 259 m$\mu$ ($\epsilon$ 0.920)

EXAMPLE 23

*21-Acetoxy-6-Methylenepregn-4-Ene-3,20-Dione*

A solution of 21-acetoxy-6-hydroxymethyl-3-methoxypregna-3,5-dien-20-one (1 g.) in acetic acid (10 ml.) was kept at ca. 100° C. for 15 minutes and then diluted with water. The crystalline solid obtained as the solution cooled was recrystallised from aqueous methanol to give 21-acetoxy-6-methylenepregn-4-ene-3,20-dione as flakes, M.P. 114 to 115° C., $[\alpha]_D^{26}$ +306° (c., 0.75 in chloroform)

$\lambda_{max.}^{EtOH}$ 260 m$\mu$ ($\epsilon$ 11,700)

EXAMPLE 24

*6-Methylene-Cortisone-17α,21-Diacetate*

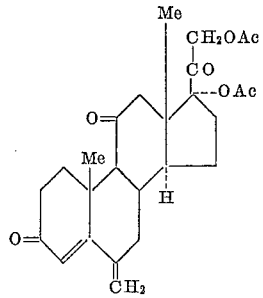

6-hydroxymethyl cortisone 17α,21-diacetate 3-methyl enol ether (0.4 g.) in acetic acid (20 ml.) was treated with a catalytic quantity (1 drop) of concentrated hydrochloric acid. After a few seconds, the solution was diluted with water and the precipitated material collected. The crude product yielded 6-methylene-cortisone-17α,21-diacetate, M.P. 229 to 230° C., $[\alpha]_D^{26}$ +234 (c., 0.921 in CHCl$_3$), $\lambda_{max.}$ 256.5 m$\mu$ ($\epsilon$ 10,910), after recrystallisation from methylene chloride/methanol.

EXAMPLE 25

*6-Methylene-17β-Acetoxy-19-Nor-Androst-4-En-3-One*

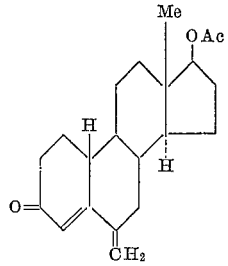

6-hydroxymethyl-3-ethoxy-17β-acetoxyandrost-3,5-diene (2.0 g.) was dissolved in glacial acetic acid (8.0 ml.) by gently warming. Water was added dropwise, with stirring, and the resulting precipitate was collected, washed with water and dried. Recrystallisation from benzene/hexane yielded 6-methylene-17β-acetoxy-19-nor-androst-4-en-3-one as colourless needles, $[\alpha]_D^{17}$ ca. 186° (c., 0.247 in CHCl$_3$), $\lambda_{max.}$ 265 m$\mu$ ($\epsilon$ 11,310), $\gamma_{max.}^{CCl_4}$ 1741, 1677, 1624, 1595, 1449, 1373, 1361, 1321, 1286 cm.$^{-1}$, $\gamma_{max.}^{CS_2}$ 1320, 1285, 1244, 1209, 1046, 1022, 966, 909, 894, 785 cm.$^{-1}$

EXAMPLE 26

*6-Methylene-17β-Acetoxy-19-Nor-Androst-4-En-3-One*

6 - hydroxymethyl-3-methoxy-17β-acetoxy-androsta-3,5-diene (1.0 g.) was dissolved in glacial acetic acid (4.0 ml.) by gentle warming. Water was added dropwise, with stirring, and the resulting precipitate was collected, washed with water and dried. Recrystallisation from benzene/hexane yielded 6-methylene-17β-acetoxy-19-norandrosta-4-en-3-one, identical with the sample reported in the previous example.

EXAMPLE 27

6-Methylenepregna-4,17(20)-Dien-3-One-21-Oate Ethyl Ester

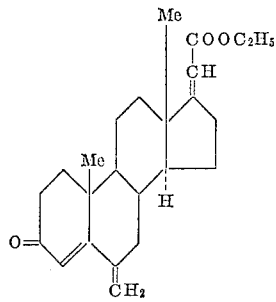

The 3-ethyl enol ether of 6-hydroxymethylpregna-4,17(20)-dien-3-one-21-oate ethyl ester (0.8 g.) was dissolved in glacial acetic acid (3.2 ml.) by gently warming. Water was added dropwise with stirring and the resulting precipitate was collected, washed with water, dried and recrystallised from methanol yielding 6-methylenepregna-4,17(20)-dien-3-one-21-oate ethyl ester, crystals, M.P. 161 to 162° C., $[\alpha]_D^{27} +251°$ (c., 0.936 in CHCl₃), $\lambda_{max.}$ 224 to 225 mμ ($\epsilon$ 20,520), $\lambda_{inf.}$ 257 mμ ($\epsilon$ 11,680), $\gamma_{max.}^{CCl_4}$ 1711, 1676, 1654, 1626, 1595, 1467, 1455, 1446, 1419, 1370, 1337, 1286 cm.⁻¹, $\gamma_{max.}^{CS_2}$ 1338, 1287, 1263, 1223, 1178, 1152, 1042, 902, 738 cm.⁻¹

EXAMPLE 28

β-(17β-Hydroxy-6-Methylene-3-Oxo-Androst-4-En-17α-yl) Propionic Acid Lactone β-(17β-hydroxy-3-ethoxy-6-hydroxymethylandrosta-3,5-dien-17α-yl) propionic acid lactone dissolved in warm glacial acetic acid was treated with a few drops of water and the mixture was then diluted with more water. The resulting gum was extracted with ether containing a few ml. of methylene chloride, the ethereal extract washed with dilute potassium carbonate solution, with water to neutrality, dried and evaporated in vacuo. Purification from aqueous methanol gave β-(17β-hydroxy-6-methylene-3-oxo-androst-4-en-17α-yl) propionic acid lactone, microcrystals, $\gamma_{max.}^{Nujol}$ 1770, 1670, 1630, 1600 and 910 cm.⁻¹

EXAMPLE 29

(a) 6-Methylene Cortisone Acetate

21 - acetoxy-17α-hydroxy-6-hydroxymethyl-3-methoxypregna-3,5-diene-11,20-dione (2 g.) in 90% aqueous acetic acid (20 ml.) was heated at 85 to 90° C., for 45 minutes, then water was added until crystallisation commenced. The product was purified from ethanol to give 6-methylene cortisone acetate, M.P. 190 to 192° C.

(b) 6-Methylene Cortisone Acetate 6-hydroxymethylcortisone 17,21-acetonide 3-enol methylether (400 g.) in 90% aqueous acetic acid was heated at 90° C. for ½ hour, then the mixture was diluted with water and extracted with chloroform. The chloroform was evaporated and the residue acetylated with acetic anhydride (2 ml.) and pyridine (1 ml.) at 50° C. for 1 hour. The product was precipitated into water and purified from ethanol, giving 6-methylene cortisone acetate, M.P. 190 to 192° C.

EXAMPLE 30

6-Methylenetestololactone

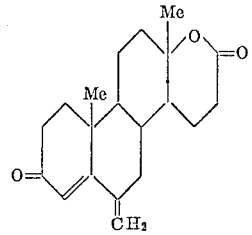

6-hydroxymethyltestololactone 3-enol methyl ether (0.4 g.) in 90% aqueous acetic acid (4 ml.) was heated at 90° C. for ½ hour, then water was added until crystallisation commenced. The product was purified from acetone/hexane to give 6-methylenetestololactone, $\lambda_{max.}$ 260 mμ ($\epsilon$=11,900) in ethanol.

EXAMPLE 31

11α,17β-Diacetoxy-6-Methyleneandrost-4-En-3-One

11α,17β - diacetoxy - 6 - hydroxymethyl - 3 - methoxyandrosta-3,5-diene (0.5 g.) in 90 % aqueous acetic acid (4 ml.) was heated at 90° C. for ½ hour, then water was added until crystallisation commenced. The product was purified from acetone/hexane to give 11α,17β-diacetoxy-6-methyleneandrost-4-en-3-one, $\lambda_{max.}$ 260 mμ ($\epsilon$=12,080) in ethanol.

EXAMPLE 32

21-Acetoxy-6-Methylenepregna-4,17(20)-Diene-3,11-Dione

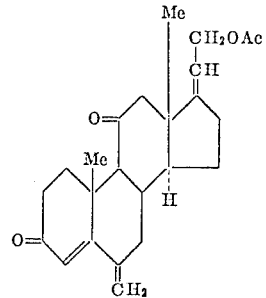

21 - acetoxy - 6 - hydroxymethyl - 3 - methoxypregna-3,5,17(20)-trien-11-one (200 mg.) in 90% aqueous acetic acid (4 ml.) was heated at 90° C. for ½ hour, then water was added until crystallisation commenced. The product was purified from acetone/hexane to give 21-acetoxy - 6 - methylenepregna-4,17(20)-diene-3,11-dione, $\lambda_{max.}$ 260 mμ ($\epsilon$=13,720) in ethanol.

EXAMPLE 33

15α-Acetoxy-6-Methyleneprogesterone

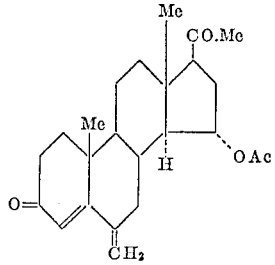

15α - acetoxy - 6 - hydroxymethyl - 3 - methoxypregna-3,5-dien-20-one (400 mg.) in 90% aqueous acetic acid (4 ml.) was heated at 90° C. for ½ hour, then water was added until crystallisation commenced. The product was purified from acetone/hexane to give 15α-acetoxy-6-methyleneprogesterone $\lambda_{max.}$ 260 mμ ($\epsilon$=12,050) in ethanol.

EXAMPLE 34

6-Methylene Testosterone Acetate

17β - acetoxy - 3 - ethoxy - 6 - hydroxymethylandrosta-3,5-diene (400 mg.) in 90% aqueous acetic acid (4 ml.) was heated at 90° C. for ½ hour, then water was added until crystallisation commenced. The product was purified from aqueous methanol to give 6-methylene testosterone acetate, M.P. 141 to 144° C.

EXAMPLE 35

6-Methylene Testosterone Acetate

17β - Acetoxy - 3β - ethoxyethoxy - 6 - hydroxymethylandrostal-3,5-diene (400 mg.) in 90% aqueous acetic acid (4 ml.) was heated at 90° C. for ½ hour, then water was added until crystallisation commenced. The product was purified from aqueous methanol to give 6-methylene testosterone acetate, M.P. 141 to 144° C.

EXAMPLE 36

16α,17α-Epoxy-6-Methyleneprogesterone

16α,17α - epoxy - 6 - hydroxymethyl - 3 - methoxypregna-3,5-dien-20-one (1 g.) was heated with 80% aqueous acetic acid for 10 minutes at 80° C., then poured into water. The precipitated material was purified from methanol to give 16α,17α-epoxy-6-methyleneprogesterone needles, M.P. 185 to 187° C., $[\alpha]_D^{25}$ +305° (c., 0.95 in dioxan), $\lambda_{max.}$ 261 m$\mu$ ($\epsilon$=11,610) in ethanol, $\gamma_{max.}$ (in CCl$_4$) 3083, 1709, 1678, 1628 and 1600 cm.$^{-1}$.

EXAMPLE 37

6-Methylene Testosterone Acetate

3 - benzyloxy - 6 - hydroxymethylandrosta - 3,5 - dien-17β-ol (1 g.) in glacial acetic acid (5 ml.) was treated with one drop of concentrated sulphuric acid for 16 hours at room temperature. Gradual dilution with water caused separation of 6-methylene testosterone acetate which after purification from aqueous methanol had M.P. 141 to 144° C.

EXAMPLE 38

6-Methylenepregn-4-Ene-3,11,20-Trione

6 - hydroxymethyl - 3 - methoxypregna - 3,5 - diene-11,20-dione (1 g.) in 90% aqueous acetone (20 ml.) was treated with toluene-p-sulphonic acid (50 mg.) for 2.5 hours at 30 to 35° C. Dilution with water gave 6-methylenepregn - 4 - ene - 3,11,20-trione, $\lambda_{max.}$ 260 m$\mu$ ($\epsilon$=10,600) in ethanol.

EXAMPLE 39

6-Methyleneandrost-4-Ene-3,17-Dione

6 - hydroxymethyl - 3 - methoxyandrosta - 3,5 - dien-17-one (250 mg.) was treated with 90% formic acid at 80° C. for 10 minutes then water was added, and the precipitated material was dried and purified from acetone/hexane to give 6-methyleneandrost-4-ene-3,17-dione in prisms, M.P. 163 to 165° C., $[\alpha]_D^{25}$ +387° (c., 0.98 in chloroform), $\lambda_{max.}$ 260.5 m$\mu$ ($\epsilon$=11,140) in ethanol, $\gamma_{max.}$ (in CCl$_4$) 3080, 3035, 1743, 1676, 1627 and 1599 cm.$^{-1}$.

EXAMPLE 40

17α-Acetoxy-21-Fluoro-6-Methylenepregn-4-Ene-3,20-Dione

A solution of 17α-acetoxy-21-fluoro-6-formyl-3-methoxypregna-3,5-dien-20-one (2 g.) in anhydrous tetrahydrofuran (70 ml.) was treated with sodium borohydride (0.4 g.). After 15 minutes, excess of reducing agent was destroyed by the addition of a littel acetic acid, and the product was precipitated with water. The crude 6-hydroxymethyl derivative so obtained was dissoived in warm acetic acid (15 ml.) and water added until crystallisation commenced. The product was purified from methanol to give 17α-acetoxy-21-fluoro-6-methylene-pregn-4-ene-3,20-dione, M.P. 205 to 207° C., $[\alpha]_D^{25}$ +272° (c., 0.93 in HCHl$_3$)

$\lambda_{max.}^{EtOH}$ 260 m$\mu$ ($\epsilon$=10.770)

EXAMPLE 41

9α-Fluoro-6-Methylenehydrocortisone Acetate

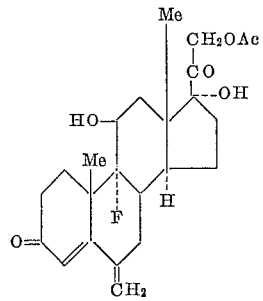

21 - acetoxy - 9α - fluoro - 11β,17α - dihydroxy - 6-hydroxymethyl - 3 - methoxypregna - 3,5 - dien - 20 - one (0.5 g.) was heated in 90% aqueous acetic acid (5 ml.) at 80 to 90° C. for 10 minutes, then water was added until the product separated out. The product was 9α-fluoro-6-methylenehydrocortisone acetate, $\lambda_{max.}$ 260 m$\mu$ ($\epsilon$=11,120) in ethanol.

EXAMPLE 42

17α-6-Methylenetestosterone

17β - hydroxy - 6 - hydroxymethyl - 3 -methoxy - 17α-methylandrosta-3,5-diene (2.5 g.) in acetic acid (30 ml.) was heated for 25 minutes at 100° C. Addition of water gave a solid which was purified from aqueous methanol. 17α-methyl-6-methylene-testosterone separated in needles, M.P. 140 to 145° C., $[\alpha]_D^{21}$ +245° (c., 0.6 in chloroform).

EXAMPLE 43

6-Methylene-Hydrocortisone Acetate

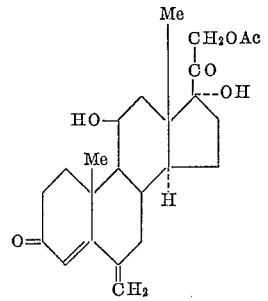

21 - acetoxy - 11β,17α - dihydroxy - 6 - hydroxymethyl-3-methoxypregna-3,5-dien-20-one (500 mg.) was heated in 95% aqueous acetic acid (3 ml.) for 10 minutes at 80° C., then precipitated into water. Purification from acetone/hexane gave 6-methylene hydrocortisone acetate, $\lambda_{max.}$ 260 m$\mu$ ($\epsilon$=11,770) in ethanol.

EXAMPLE 44

6-Methylene-9β,10α-Progesterone

A solution of 6-hydroxymethyl-3-methoxy-9β,10α-pregna-3,5-dien-20-one (0.5 g.) in acetic acid (5 ml.) was kept at 100° C. for ¼ hour and poured into water. The precipitated product was 6-methylene-9β,10α-progesterone, having $\gamma_{max.}^{Nujol}$ 1710, 1675, 1635 and 1605 cm.$^{-1}$

We claim:

1. A process for the preparation of 6-methylene-3-oxo-

Δ⁴-steroids having in rings A and B of the steroid nucleus, the structure

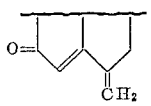

which process comprises treating a 3-enol ether of a 6-hydroxymethyl steriod having in rings A and B of the steroid nucleus the structure

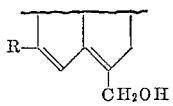

where R is selected from the group consisting of O-alkyl, O-hydroxyalkyl, O-cycloalkyl and O-alkaryl, wherein the members of said group have from 1 to 7 carbon atoms, with an acidic reagent capable of regenerating 3-oxo-Δ⁴-steroids from their corresponding 3-enol ethers to thereby effect such regeneration and concomitantly reduce the 6-hydroxymethyl group to a 6-methylene group.

2. A process as claimed in claim 1 wherein the acidic reagent is acetic acid.

3. 21 - acetoxy - 17α - hydroxy - 6 - methylenepregna-4,9(11)-diene-3,20-dione.

4. 17α - acetoxy - 6,16 - dimethylenepregn - 4-ene-3,20-dione.

5. 6 - methylene - 16α,17α - isopropylidenedioxypregn-4-ene-3,20-dione.

6. 6-methyleneprogesterone.

7. 17β-acetoxy-2α-methyl - 6 - methyleneandrost-4-en-3-one.

8. 17β-acetoxy-6-methyleneandrost-4-en-3-one.

9. 6-methylenetestosterone.

10. 17β-acetoxy-17α - methyl - 6 - methyleneandrost-4-en-3-one.

11. 17β-propionoxy - 6 - methylene-17α-vinylandrost-4-en-3-one.

12. 16-methyl - 6 - methylenepregna - 4,16-diene-3,20-dione.

13. 6-methylene-25D-spirost-4-en-3-one.

14. 20β-acetoxy-6-methylenepregn-4-en-3-one.

15. 6-methylenepregna-4,17(20)-dien - 3 - one-21-oate ethyl ester.

16. 6 - methylene - 17β - propionoxy - 17α - (prop-1'-ynyl)-androst-4-en-3-one.

17. 11α,17β - diacetoxy - 6 - methyleneandrost - 4 - en-3-one.

18. 6-methylenetestololactone.

19. 9α-fluoro-6-methylenehydrocortisone acetate.

20. 6-methylene-17α-methyltestosterone.

References Cited in the file of this patent
UNITED STATES PATENTS

| | | |
|---|---|---|
| 2,940,968 | Sletzinger et al. | June 14, 1960 |
| 2,980,711 | Colton | Apr. 18, 1961 |
| 3,074,935 | Fried et al. | Jan. 22, 1963 |